United States Patent [19]
Racioppi et al.

[11] Patent Number: 5,943,756
[45] Date of Patent: Aug. 31, 1999

[54] METHOD OF CALIBRATOR CHANGEOVER

[75] Inventors: Pat A. Racioppi, Sarver; Rocco D. Nocera, Zelienople, both of Pa.

[73] Assignee: VEKA, Inc., Fombell, Pa.

[21] Appl. No.: 09/075,196

[22] Filed: May 8, 1998

Related U.S. Application Data

[62] Division of application No. 08/626,482, Apr. 2, 1996, Pat. No. 5,780,071.

[51] Int. Cl.[6] ........................................... B29C 47/90
[52] U.S. Cl. ........................... 29/466; 29/525.11; 264/39; 264/209.4; 425/186; 425/326.1
[58] Field of Search .................. 425/71, 186, 326.1, 425/387.1, 388, 72.1; 264/560, 564, 565, 39, 568, 571, 209.4; 29/464, 466, 525.11

[56] References Cited

U.S. PATENT DOCUMENTS

| | | |
|---|---|---|
| 3,473,194 | 10/1969 | Farrow ........................................ 425/71 |
| 4,120,926 | 10/1978 | Titz . |
| 4,181,487 | 1/1980 | Kessler ...................................... 425/388 |
| 4,401,424 | 8/1983 | De Zen ................................. 425/326.1 |
| 4,468,369 | 8/1984 | Gauchel et al. ......................... 264/560 |
| 5,116,450 | 5/1992 | Spoo et al. .............................. 156/441 |
| 5,139,402 | 8/1992 | Topf ...................................... 425/326.1 |
| 5,288,218 | 2/1994 | Melkonian ................................ 425/71 |
| 5,316,459 | 5/1994 | Melkonian et al. ................... 425/72.1 |
| 5,324,187 | 6/1994 | Cook ..................................... 425/131.1 |
| 5,468,442 | 11/1995 | Brambilla ................................. 425/71 |

*Primary Examiner*—Harold Pyon
*Assistant Examiner*—Joseph Leyson
*Attorney, Agent, or Firm*—Frederick L. Tolhurst

[57] ABSTRACT

Calibrators (10–16) are pre-aligned on a base (18) that is positioned on a table (60). A guide (82) includes a first section (84a, 84b) connected to base (18) and a second section (94) connected to table (60). First section (84a, 84b) cooperates with second section (94) to laterally maintain base (18) on table (60) while allowing thermal expansion of base (18) in the direction of a longitudinal axis (22).

5 Claims, 2 Drawing Sheets

METHOD OF CALIBRATOR CHANGEOVER

This is a divisional of copending application Ser. No. 08/626,482 filed on Apr. 2, 1996, now U.S. Pat. No. 5,780, 071.

BACKGROUND OF THE INVENTION

1. Field of the Invention

The subject invention is directed to systems for extruding thermoplastic shapes and, more specifically, systems and methods for the replacement of calibrators in plastic extrusion systems.

2. Description of the Prior Art

Various types of apparatus and methods for shaping materials according to selected profiles have been developed. These methods vary depending on the properties of the materials as well as other factors. Examples include aluminum extrusion and paltrusion of resin impregnated fibers as described in U. S. Pat. No. 5,116,450.

In the case of thermoplastic materials such as vinyl plastic, the material is shaped by being heated and extruded through a die. Basically, thermoplastic resins are fed into a heating element. The heated resin exits the heating element and is passed through a die of predetermined shape. The extruded length is drawn by a puller that maintains predetermined tension on the material length. The drawn length of material is then cooled and cut to a given length. As the material exits the die; it has sufficient plasticity that steps must be taken to maintain the extruded shape while heat is removed from the material until it attains sufficient rigidity.

Various mechanisms have been developed in the prior art to maintain this extruded shape. Frequently, calibrators such as described in U.S. Pat. Nos. 4,468,369 and 4,120,926 are used for this purpose. These devices selectively apply vacuum to the extrusion to control its shape. The interior walls of the calibrator provide additional sizing. At the same time, cooling water is circulated to internal passages in the calibrator to provide temperature control of the calibrators. Heat is thereby conducted away from the extruded material to increase its rigidity.

Frequently, a plurality of calibrators are used, due to limitations on deformation in the plastic material through any single calibrator. These are arrayed in linear fashion such that the extruded material serially passes through each calibrator and is progressively shaped and solidified as it passes through each calibrator.

It has been recognized in the prior art that each of the calibrators should be aligned with the longitudinal axis of the extruded material to reduce the strain on the material. Non-alignment of the calibrators tends to cause increased strain on that portion of the material that is in tension. This tended to slow the rate of manufacture and also adversely affected product quality. In some cases, this could result in broken or poorly shaped lengths. In the prior art, the narrow alignment tolerances in combination with the multiple connections required for vacuum and cooling water lines has required substantial set-up times when there is a changeover to a different extruded profile. During this set-up time, the extrusion line could not be productively used adding to the difficulty and cost of the manufacturing process.

The problems resulting from calibrator alignment requirements were recognized in the prior art as mentioned, for example, in U.S. Pat. Nos. 5,316,459 and 5,288,218. Attempts to address this problem generally involved incorporating all of the calibrator profiles in a single body as shown in U.S. Pat. No. 4,401,424. However, this required the redesign and manufacture of all existing calibrators.

Various schemes for pre-alignment of existing calibrators have been proposed from time-to-time. However, these have generally not been workable in practice because those pre-alignment techniques did not allow for differences in thermal expansion rates between the different components of the extrusion system. That is, the calibrators, which are typically made of aluminum, would vary in size in response to a given temperature change. The expansion rate of the calibrators was significantly higher than the rate of extrusion table and other system elements that were made of steel. This, in combination with the requirement for close alignment tolerances, created difficulty with certain pre-alignment techniques. For example, locator pins could not be used because the pins would register with the locator holes only within a narrow band of temperatures. If the tolerances in the pin-hole combinations were increased, the alignment tolerances for the calibrators would no longer be met.

Accordingly, there was a need in the prior art for a pre-alignment system and method that would meet tolerance limits for alignment of the calibrators and still be operable over a relatively wide band of temperatures.

SUMMARY OF THE INVENTION

In accordance with the subject invention, a plurality of calibrators are connected to a base. The extrusion system includes a support table. The calibrators each define a profile and are arranged in a linear array such that selected points on each profile define an axis. A guide includes first and second sections that cooperate in mating relationship and that also cooperate in sliding engagement in a direction that is substantially parallel to the axis of the calibrators. The first section of the guide is connected to the base and the second section of said guide is connected to a support table. Means for securing the base to the table is also included.

Preferably the guide opposes movement of the base with respect to the table in directions that are substantially orthogonal to the longitudinal axis.

More preferably, one section of said guide includes an extended portion and the other section of said guide includes a recessed portion.

Other objects and advantages of the invention disclosed herein will become apparent to those skilled in the art as a description of a preferred embodiment of invention proceeds.

BRIEF DESCRIPTION OF THE DRAWINGS

A presently preferred embodiment of the invention disclosed herein is shown and described in connection with the accompanying drawings wherein.

PREFERRED EMBODIMENT OF THE INVENTION

Figure 1:
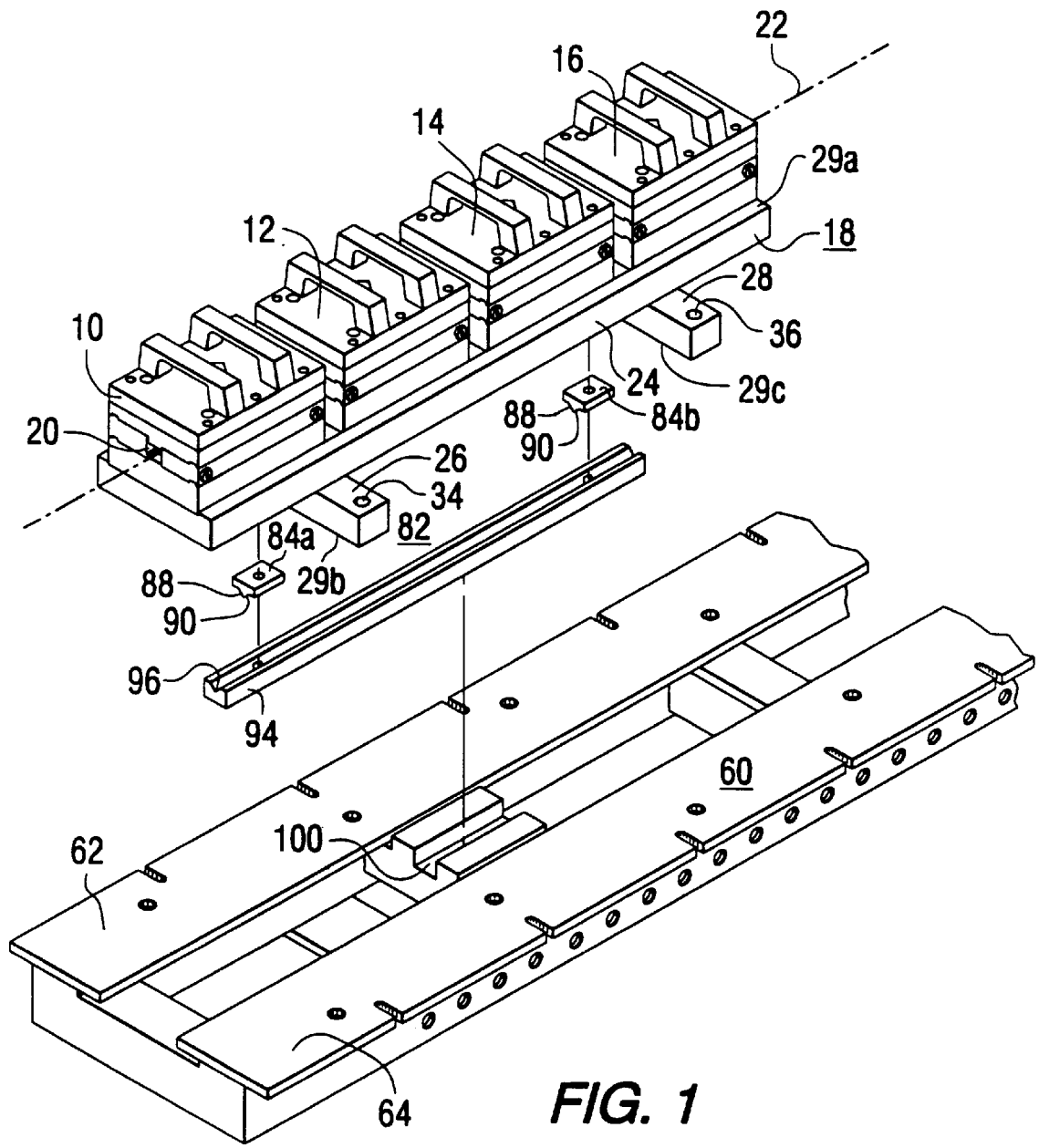
FIG. 1 is an exploded orthogonal view of the disclosed pallet in cooperation with a base plate and calibration table.
Figure 2:
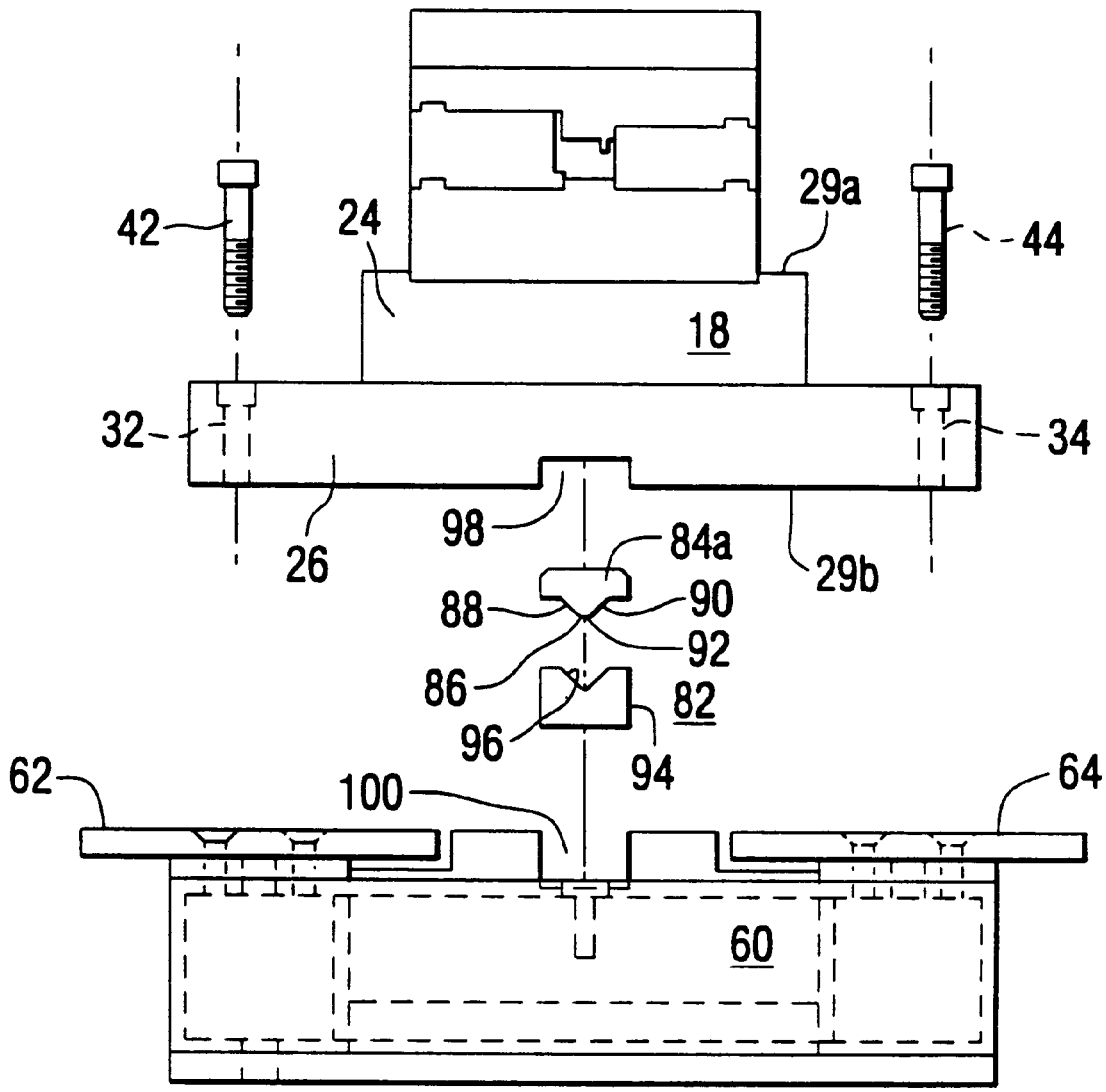
FIG. 2 is an elevation view of the assembly taken along the line II—II of FIG. 1.

As shown in FIGS. 1 and 2, calibrators 10, 12, 14 and 16 are arranged in a linear array and secured to a base 18. As well known in the art, calibrators 10–16 are used in connection with an extruder (not shown) and other equipment (not shown) to extrude thermoplastic material such as vinyl or other material. Calibrators 10–16 are provided with internal manifolds and vacuum ports as well as internal passages for liquid coolants. Vacuum from external pumps (not shown) are connected to the vacuum ports and distributed through the manifolds to control the shape of the plastic extrusion. Coolant supplied to the internal passageways controls the temperature of the calibrator and thereby serves to conduct heat away from the plastic extrusion.

Calibrators 10–16 include a central passageway 20 the surfaces of which serve to define the profile of the extruded material. Accordingly, calibrators 10–16 are unique to a particular extrusion profile. When it is desired to produce an extrusion having a different profile, calibrators 10-16 must be changed over to different calibrators having a passageway that defines the appropriate profile.

The calibrator passageways control the extruded profiles within critical tolerances. Therefore, the calibrators must be precisely aligned with respect to a common axis 22 such that passageways 20 of calibrators 10–16 collectively define a linear extrusion pathway that limits damage to surface finishes, internal strains and other unwanted results. During this changeover period, the extrusion line is non-productive. The invention disclosed herein substantially reduces the time required for changeovers because the time consuming aspect of alignment is done off-line with no loss of production. At times of changeover, the pre-aligned calibrators are quickly and easily installed.

Calibrators 10–16 are mounted on base 18 in a pre-alignment step before the calibrators are installed on the extrusion line. During pre-alignment, calibrators 10–16 are secured to base 18 by bolts or other fixed means. More particularly, base 18 includes base plate 24 and legs 26 and 28. Legs 26 and 28 are secured to base plate 24 by screws or other fixed means. Base 18 includes surface 29*a* of base plate 24 and surfaces 29*b* and 29*c* of legs 26 and 28 respectively. As shown in the drawings, surface 29*a* is oppositely disposed on base 18 from surfaces 29*b* and 29*c*. Calibrators 10–16 are secured to surface 29*a* of base plate 24. Calibrators 10–16 are aligned on base 18 in accordance with conventional procedures familiar to those skilled in the art such that given points on the profile surfaces of the respective calibrators define an axis 22. In this way, passageways 20 are substantially aligned along axis 22.

To install calibrators 10–16 on table 60 of the extrusion system, base 18 is placed on table 60. In the example of the preferred embodiment, legs 26 and 28 of base 18 are provided with bore holes 32, 34 and 36. Table 60 includes support surfaces 62 and 64 although other configurations of table 60 could also be used. Legs 26 and 28 of base 18 are secured to table 60 by fastening means such as bolts 42 and 44 that are threadingly engaged with table 60. Bore holes 32, 34 and 36 are oversized with respect to bolts 42 and 44 such that base 18 can move with respect to table 60 in response to temperature variation of base 18 and table 60.

As also shown in FIGS. 1 and 2, base 18 is positioned laterally on table 60 by guide 82. Guide 82 includes at least one first member 84*a*, 84*b* having an extended portion 86 that is defined between converging surfaces 88 and 90. Preferably, extended portions 86 have an apical end 92 that is radiused.

Guide 82 further includes a second member 94 that cooperates in engaging relationship with first member 84*a*, 84*b*. As shown in FIGS. 1 and 2, second member 94 includes a V-shaped linear groove 96 that is sized to receive extended portion 86 of first member 84*a*, 84*b*. In the preferred embodiment, first members 84*a* and 84*b* are located in respective recessed areas 98 of legs 26 and 28 and secured to legs 26 and 28. Second member 94 is located in a rectangular slot 100 in table 60 and connected to table 60. However, it is within the scope of the disclosed invention that the respective position of members 84*a*, 84*b* and 94 could be interchanged. Also, guide 82 could include more than one set of first and second members 84*a*, 84*b* and 94 where such members are aligned with a longitudinal axis that is parallel to axis 22 and located on base 18 and table 60 at positions along such longitudinal axis.

As base 18 is lowered onto table 60, extended portion 86 of first member 84 engages the V-shaped groove 96 of second member 94. The sides 88 and 90 cooperate with the sides of V-shaped groove 96 to laterally guide legs 26 and 28 onto table 60. Due to the shape of extended portion 86 and V-shaped groove 96, the first and second members 84*a*, 84*b* and 94 are in substantially sliding engagement with respect to movement in the direction of axis 22. Thus, first and second members 84*a*, 84*b* and 94 are in substantially sliding engagement in a direction substantially parallel to axis 22. but oppose movement in directions substantially orthogonal to axis 22. In this way. base 18 is allowed to expand in the longitudinal direction in response to temperature variation, but is maintained within relatively close tolerances in the orthogonal direction so that calibrators 10–16 remain substantially aligned with respect to axis 22.

Typically, base 18 is made of aluminum and table 60 is made of steel. Also typically, base 18 is several meters long. Due to the substantial difference between the coefficient of thermal expansion of steel and the coefficient of thermal expansion of aluminum, a change of temperature of those components will cause the aluminum to vary greater in the longitudinal dimension than the steel. Alternatively. clamps or other fastening means could also be used. The sliding engagement of guide 82 allows movement between base 18 and table 60 in the longitudinal direction to avoid unnecessary stresses and strains within those components and to avoid lateral displacement of base 18 on table 60 or with respect to axis 22.

As will be apparent to those skilled in the art, other embodiments of the invention disclosed herein may be included within the scope of the following claims.

We claim:

1. A method for setting up calibrators having passageways that define profiles, said calibrators being used in a thermoplastic extrusion system, said method comprising the steps of:

aligning the calibrators on one side of a base such that selected points on the profiles of the respective calibrators define a longitudinal axis, where the side of the base that is oppositely disposed from said one side has one member of a guide secured thereto;

positioning the base on a work table that has a second member of the guide secured thereto, said second member of said guide cooperating with said one member such that the one member of said guide that is secured to the base engages the cooperating member of said guide that is secured to the work table; and securing said base to said work table such that one member of said guide is slidable with respect to the other member of said guide in response to temperature variations of said base and in response to temperature variations of said work table.

2. The method of claim 1 wherein the one member of said guide cooperates with the second member of said guide to direct the sliding movement in a direction that is substantially parallel to the longitudinal axis defined by the profiles of said calibrators.

3. A method for changeover of a linear array of calibrators that are used in an extrusion line, said calibrators having respective profile surfaces that define passageways therein, said method comprising the steps of:

mounting the calibrators on a base before said base is installed in the extrusion line, said base having a first guide member connected thereto and said calibrators being mounted on the base such that given points of the profile surfaces of the respective calibrators are aligned with respect to a longitudinal axis;

placing the base on an extrusion table, said extrusion table having a second guide member connected thereto, said base being located on said extrusion table such that said first guide member engages said second guide member and said first and second guide members cooperate to position said base on said extrusion table laterally with respect to said longitudinal axis; and fastening the base to said extrusion table such that said base is secured to said extrusion table and such that said base is also moveable with respect to said extrusion table along the guide members in response to temperature variations of said base and said extrusion table.

4. The method of claim 3 wherein said placing step further comprises engaging the first guide member and the second guide member such that the first guide member slides with respect to the second guide member in a direction that is substantially parallel to the longitudinal axis and wherein the first guide member opposes movement of the second guide member in directions that are substantially orthogonal to the longitudinal axis.

5. A method for replacement of calibrators in a thermoplastic extrusion line, said method comprising the steps of:

mounting the calibrators on a base before said base is installed in the extrusion line, said base having a first guide member connected thereto and said calibrators being mounted on the base such that given points of profile surfaces of the respective calibrators are aligned with respect to a longitudinal axis;

placing the base on an extrusion table, said extrusion table having a second guide member connected thereto, said second guide member being adapted for mating engagement with said first guide member, said base being placed on said extrusion table with said first guide member engaging said second guide member and the first guide member sliding with respect to the second guide member in a direction that is substantially parallel to the longitudinal axis and the first guide member opposing movement of the second guide member in directions that are substantially orthogonal to the longitudinal axis such that said first and second guide members cooperate to position said base on said extrusion table laterally with respect to said longitudinal axis; and fastening the base to said extrusion table such that said base is secured to said extrusion table and such that said base is also moveable with respect to said extrusion table along the guide members in response to temperature variations of said base and said extrusion table.

* * * * *